United States Patent
Pencak et al.

(10) Patent No.: US 10,029,735 B2
(45) Date of Patent: Jul. 24, 2018

(54) VEHICLE BODY STRUCTURE

(71) Applicant: Nissan North America, Inc., Franklin, TN (US)

(72) Inventors: Jeffrey Pencak, Cass City, MI (US); Thomas Domlovil, Farmington Hills, MI (US); Paul Dyde, Walled Lake, MI (US); Ari Schiftan, Royal Oak, MI (US)

(73) Assignee: Nissan North America, Inc., Franklin, TN (US)

( * ) Notice: Subject to any disclaimer, the term of this patent is extended or adjusted under 35 U.S.C. 154(b) by 58 days.

(21) Appl. No.: 15/010,397

(22) Filed: Jan. 29, 2016

(65) Prior Publication Data
US 2017/0217499 A1   Aug. 3, 2017

(51) Int. Cl.
*B62D 25/02* (2006.01)
*B60R 21/0136* (2006.01)
*B62D 21/15* (2006.01)

(52) U.S. Cl.
CPC .......... *B62D 25/02* (2013.01); *B60R 21/0136* (2013.01); *B62D 21/157* (2013.01)

(58) Field of Classification Search
CPC .... B62D 25/02; B62D 21/157; B60R 21/0136
See application file for complete search history.

(56) References Cited

U.S. PATENT DOCUMENTS

| 4,973,103 | A | * | 11/1990 | Imajyo | B62D 25/02 296/191 |
| 5,160,465 | A | * | 11/1992 | Soderberg | B60R 13/08 264/277 |
| 5,793,005 | A | * | 8/1998 | Kato | B60R 21/013 180/282 |
| 7,753,419 | B2 | * | 7/2010 | Kondo | B60R 19/483 180/274 |
| 7,992,920 | B2 | * | 8/2011 | Deng | B60J 5/042 296/146.6 |
| 9,592,855 | B2 | * | 3/2017 | Kindaichi | B62D 25/025 |
| 2004/0113455 | A1 | * | 6/2004 | Schmidt | B60J 5/0451 296/146.6 |
| 2005/0173903 | A1 | * | 8/2005 | Mellor | B60R 21/0428 280/730.2 |
| 2006/0152041 | A1 | * | 7/2006 | Igarashi | B62D 29/001 296/187.02 |
| 2008/0077328 | A1 | * | 3/2008 | Simmons | B60R 21/0136 701/301 |
| 2008/0224461 | A1 | * | 9/2008 | Allen | B60P 3/14 280/830 |
| 2009/0167300 | A1 | * | 7/2009 | Cech | B60R 21/0134 324/239 |

(Continued)

*Primary Examiner* — Darlene P Condra

(57) ABSTRACT

A vehicle body structure includes a first panel, a second panel, a pulse detection sensor and a gap reduction member. The first panel has a first main section and a sensor installation location that is spaced apart from the first main section. The second panel has a second main section that is spaced apart from the first main section of the first panel and defines a gap therebetween. The pulse detection sensor is attached to the first panel at the sensor installation location. The gap reduction member is installed to the first main section of the first panel. The gap reduction member extends from the first main section toward the second main section within the gap.

20 Claims, 8 Drawing Sheets

(56) References Cited

U.S. PATENT DOCUMENTS

| | | | |
|---|---|---|---|
| 2009/0248253 A1* | 10/2009 | Le | B60R 21/0132 701/45 |
| 2012/0296567 A1* | 11/2012 | Breed | G01C 21/26 701/468 |
| 2013/0013156 A1* | 1/2013 | Watanabe | B60R 21/0136 701/45 |
| 2014/0001738 A1* | 1/2014 | Ikuta | B60R 21/0136 280/735 |
| 2014/0367947 A1* | 12/2014 | Torii | B60R 21/0428 280/730.2 |
| 2015/0258956 A1* | 9/2015 | Sassi | B60R 21/0136 701/45 |
| 2015/0330112 A1* | 11/2015 | Van Wiemeersch | E05B 81/76 292/201 |
| 2017/0274936 A1* | 9/2017 | Ishii | B62D 25/025 |

* cited by examiner

VEHICLE BODY STRUCTURE

BACKGROUND

Field of the Invention

The present invention generally relates to a vehicle body structure. More specifically, the present invention relates to a vehicle body structure having an inner panel and an outer panel that are spaced apart from one another with a gap defined therebetween, with a gap reduction member installed between the inner panel and the outer panel reducing the size of the gap defined therebetween.

Background Information

An airbag system installed within a vehicle typically has a sensor connected thereto that triggers inflation of an airbag in response to detection of a predetermined level of force acting on the sensor.

SUMMARY

One object of the disclosure is to provide a vehicle body structure with non-structural elements that are configured to transmit forces acting on the vehicle body structure to an airbag pulse detection sensor.

In view of the state of the known technology, one aspect of the present disclosure is to provide a vehicle body structure with a first panel, a second panel, a pulse detection sensor and a gap reduction member. The first panel has a first main section and a sensor installation location that is spaced apart from the first main section. The second panel has a second main section that is spaced apart from the first main section of the first panel and defines a gap therebetween. The pulse detection sensor is attached to the first panel at the sensor installation location. The gap reduction member is installed to the first main section of the first panel. The gap reduction member extends from the first main section toward the second main section within the gap.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
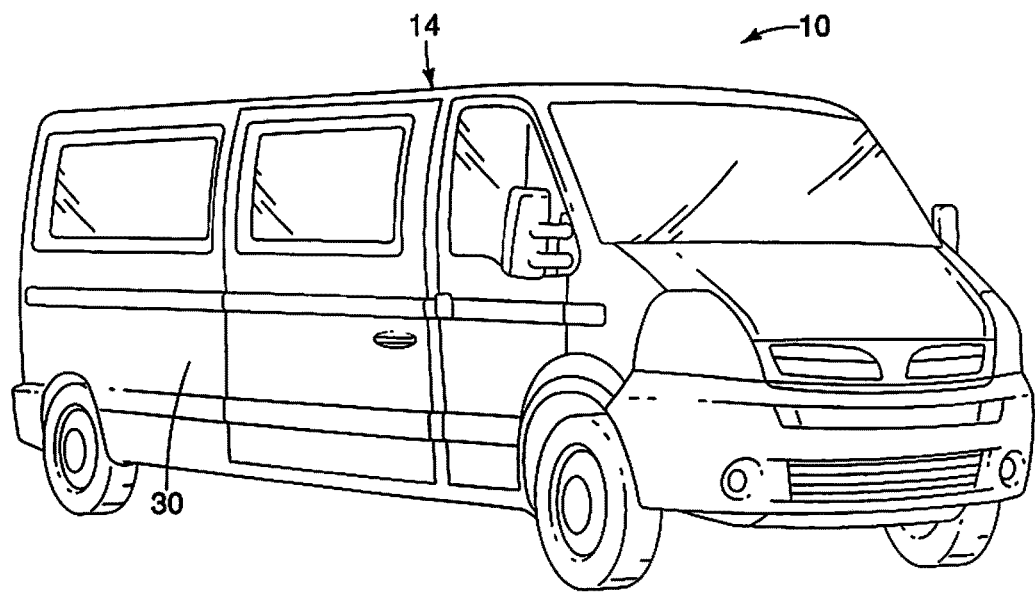
FIG. 1 is a perspective view of a vehicle that includes an airbag system with pulse detection sensors and airbag assemblies, the vehicle also including a vehicle body structure with a gap reduction member in accordance with a first embodiment.

Referring initially to FIG. 1, a vehicle 10 is illustrated in accordance with a first embodiment. The vehicle 10 includes an airbag system 12 shown in FIG. 2 and a vehicle body structure 14 shown in FIGS. 1 and 3-7.

Figure 2:
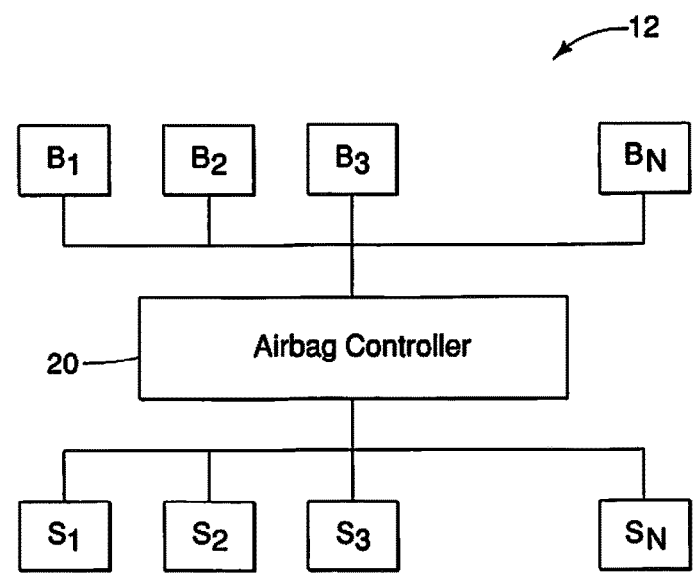
FIG. 2 is a schematic view of the airbag system showing a plurality of the airbag assemblies and a plurality of the pulse detection sensors in accordance with the first embodiment.
Figure 3:
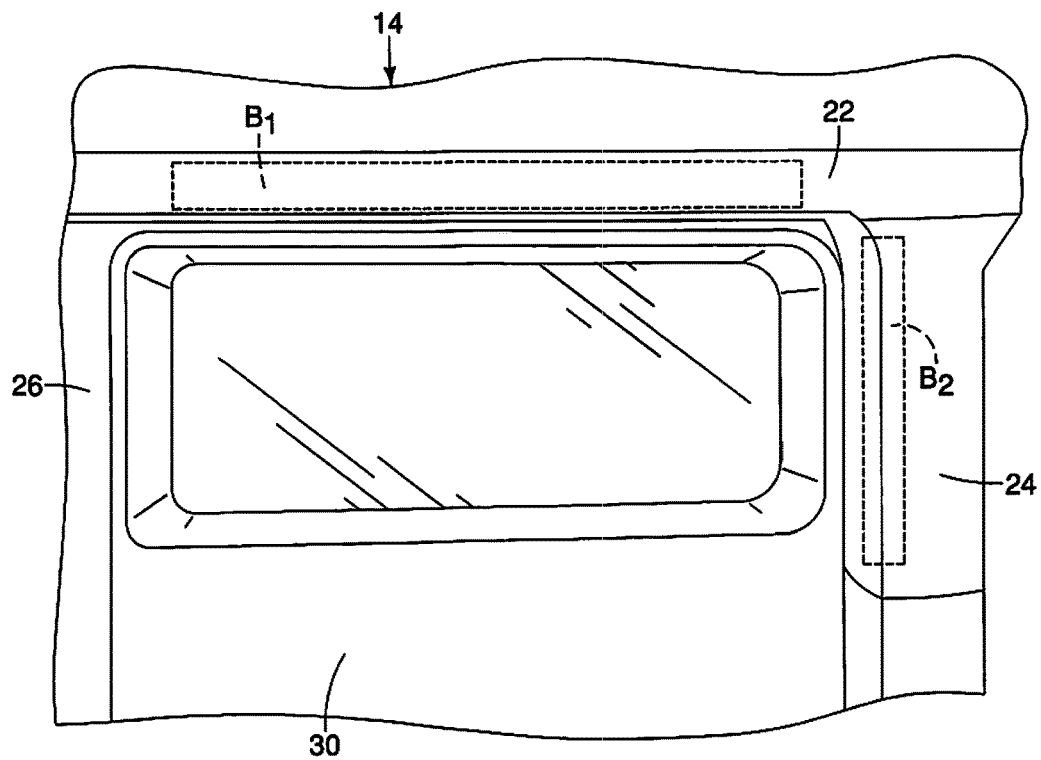
FIG. 3 is a side view of a side wall structure of the vehicle body structure showing two of the plurality of airbag assemblies in a stowed orientation in accordance with the first embodiment.
Figure 4:
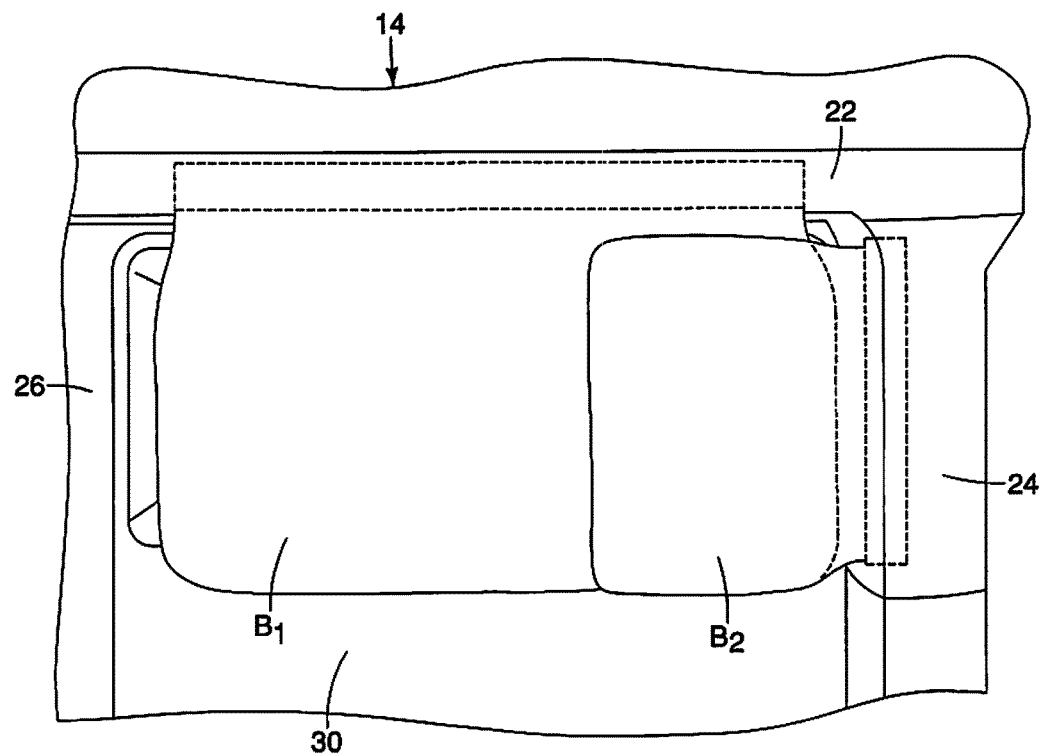
FIG. 4 is another side view of the side wall structure of the vehicle body structure showing the two of the plurality of airbag assemblies in a deployed orientation in accordance with the first embodiment.

As shown in FIG. 2, the airbag system 12 includes a controller 20 (a triggering device), a plurality of airbag assemblies $B_1$ through $B_N$, and a plurality of sensors $S_1$ through $S_N$. The airbag assemblies $B_1$ through $B_N$ are installed at predetermined locations in and around a passenger compartment defined within the vehicle body structure 14. For example, as shown in FIGS. 3 and 4, two of the airbag assemblies $B_1$ and $B_2$ are installed in areas along a side wall structure 30 of the vehicle 10. Specifically, the airbag assembly $B_1$ is installed along a roof rail 22 and the airbag assembly $B_2$ is installed along a B-pillar 24. In FIGS. 3 and 4, a C-pillar 26 is also shown. It should be understood from the drawings and the description herein that another airbag assembly can be installed to the C-pillar 26. It should further be understood from the drawings and the description herein that airbag assemblies can be installed within seats (not shown), within the instrument panel (not shown) and within a headliner (not shown) that covers an interior of a roof structure 28 of the vehicle 10. Since the location and positioning of airbag assemblies within the vehicle body structure 14 is conventional, further description is omitted for the sake of brevity.

Similarly, the sensors $S_1$ through $S_N$ are positioned at strategic locations around the vehicle body structure 14 in order to detect predetermined levels of force applied to various locations around the vehicle body structure 14. The sensors $S_1$ through $S_N$ can be any of a variety of sensors, but are preferably sensors that are configured to detect rapid changes in velocity and/or acceleration of the vehicle body structure and are also herein below referred to as pulse detection sensors. Specifically, upon detection of application of a predetermined level of force F to the vehicle body structure 14 which produces a rapid change in velocity and/or acceleration of the vehicle body structure 14, one or more of the sensors $S_1$ through $S_N$ detects the pulse (a rapid change in velocity and/or acceleration), sends a signal to the controller 20 and the controller 20 then triggers one or more of the airbag assemblies $B_1$ and $B_N$ to inflate in a conventional manner. FIG. 3 shows the airbag assemblies $B_1$ and $B_2$ in a stowed orientation prior to detection of a predetermined level of force. FIG. 4 shows the airbag assemblies $B_1$ and $B_2$ in a deployed or inflated orientation after to detection of the predetermined level of force on the vehicle body structure 14, as sensed by at least one of the sensors $S_1$ through $S_N$, and deployed by the controller 20.

It should be understood from the drawings and the description herein that at least the controller 20 and the sensors $S_1$ through $S_N$, can further be part of response system (not shown) provided within the vehicle 10 that includes a seatbelt pre-tensioning features where the controller 20 automatically pre-tensions seatbelts (not shown) in response to detection of the predetermined level of force. Additionally, the response system and/or the controller 20 can be connected to or can include a wireless communication device such that an alert signal can be broadcast to a third party (for example, emergency responders) in response to detection of the predetermined level of force F. The controller 20, the sensors $S_1$ through $S_N$ and the wireless communication device basically define a force contact response system that can communicate with other vehicles and/or with wireless communication devices.

Since operation of the sensors $S_1$ through $S_N$, operation of the airbag assemblies $B_1$ through $B_N$ and operation of the controller 20 are conventional, further description is omitted for the sake of brevity.

Figure 5:
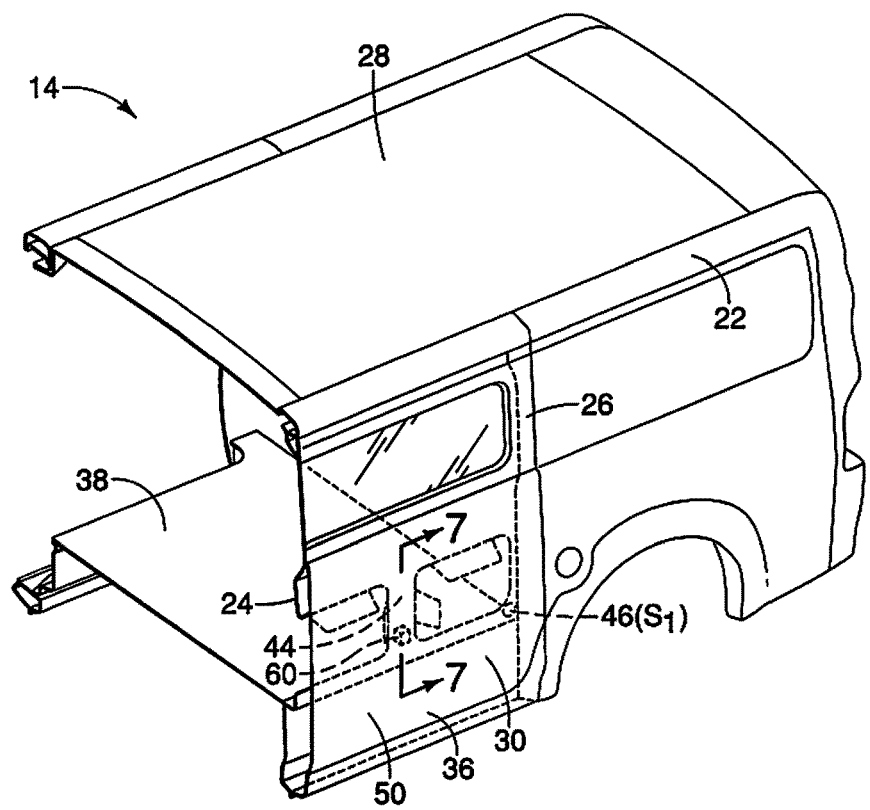
FIG. 5 is a perspective view a portion of the vehicle body structure showing the side wall structure including an inner panel and an outer panel, the inner panel having a sensor installation location in accordance with the first embodiment.
Figure 6:
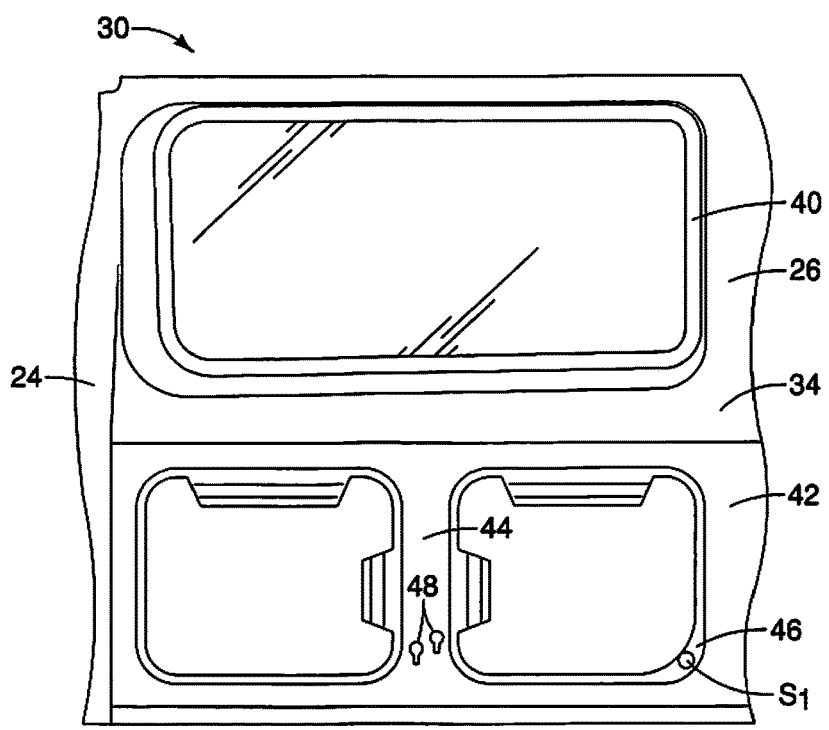
FIG. 6 is side view of the inner panel removed from the vehicle body structure showing the sensor installation location and a first main section in accordance with the first embodiment.
Figure 7:
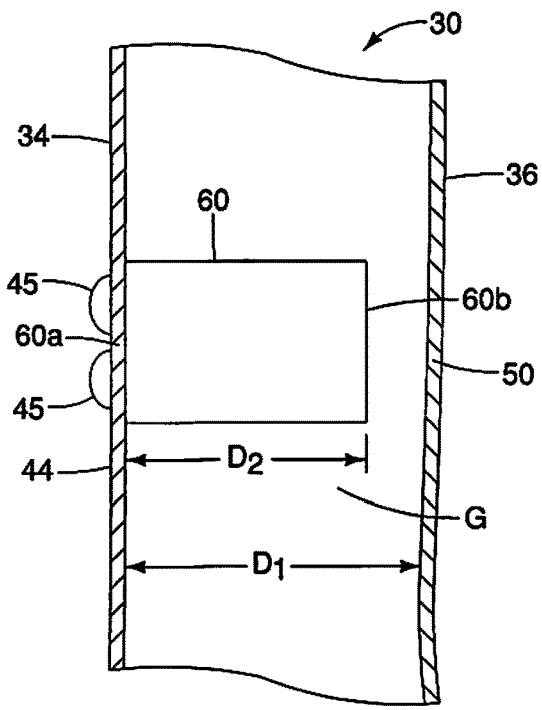
FIG. 7 is a cross-sectional view of a portion of the side wall structure taken along the line 7-7 in FIG. 5 showing the first main section of the inner panel, a portion of a second main section of the outer panel with a gap defined between the first and second main section, with a gap reduction member installed to the first main section of the inner panel within the gap in accordance with the first embodiment.

A description of the vehicle body structure 14 is now provided with specific reference to FIGS. 5-7. The vehicle body structure 14 includes, among other features, the roof rail 22, the B-pillar 24, the C-pillar 26, the roof structure 28 and the side wall structure 30.

In FIGS. 3 and 4, the side wall structure 30 includes interior trim panels that have been removed in FIGS. 5, 6 and 7. As shown in FIGS. 5, 6 and 7, the side wall structure 30 includes an inner panel 34 and an outer panel 36. The inner panel 34 and the outer panel 36 are attached to one another along the roof rail 22, the B-pillar 24, the C-pillar 26, at a floor 38 of the cabin (passenger compartment) of the vehicle 10 and also along a bottom edge of the side wall structure 30. As shown in FIG. 5, the outer panel 36 is attached to the roof rail 22, the inner panel 34 is attached to the floor 38 above the location of the attachment of the inner panel 34 to the outer panel 36. Hence, the inner panel 34 and the outer panel 36 each define attachment locations along the roof rail 22, the B-pillar 24, the C-pillar 26 and the floor 38.

An outboard surface of the inner panel 34 is shown in FIG. 6 with the outer panel 36 removed. The inner panel 34 (a first panel) includes an upper window receiving area 40 and a lower area 42. Lateral sides of the inner panel 34 also at least partially define the B-pillar 24 and the C-pillar 26 of the vehicle body structure 14. The lower area 42 of the inner panel 34 defines a first main section 44 and a sensor installation location 46 that is spaced apart from the first main section 44. One of the sensors $S_1$ (a pulse detection sensor) is installed to the lower area 42 of the inner panel 34 at the sensor installation location 46, shown in FIG. 5 as being adjacent to the C-pillar 26. As shown in FIGS. 5 and 6, the first main section 44 extends in a vertical direction below a central region of the upper window receiving area 40, and is spaced apart from the B-pillar 24 and spaced apart from the C-pillar 26. Further, as shown in FIGS. 5 and 6, the first main section 44 does not contact either of the B-pillar 24 and the C-pillar 26. The first main section 44 also include a pair of fastener receiving openings 48 that are described in greater detail below.

The outer panel 36 (a second panel) has a second main section 50 defining an exterior side wall surface of the vehicle 10. As shown in FIG. 7, the second main section 50 of the outer panel 36 is spaced apart from the first main section 44 of the inner panel 34 defining a gap G therebetween.

Figure 8:
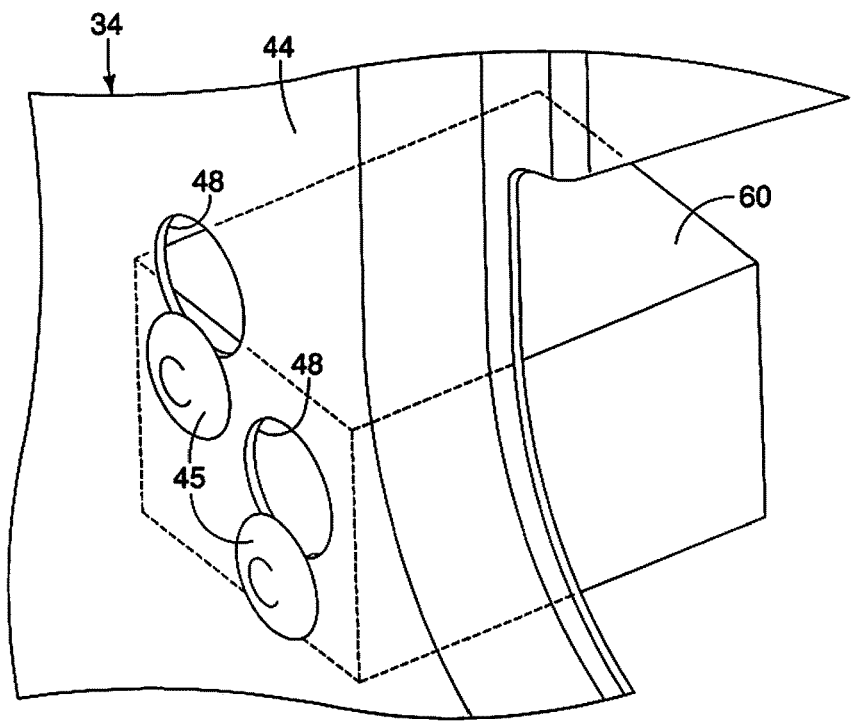
FIG. 8 is a perspective view of a portion of the first main section of the inner panel showing the gap reduction member attached to the inner panel via mechanical fasteners in accordance with the first embodiment.

As shown in FIG. 7, a gap reduction member 60 is installed to the first main section 44 of the first panel 34 within the gap G. Specifically, the gap reduction member 60 extends from the first main section 44 toward the second main section 50 of the outer panel 36 within the gap G, but does not contact the second main section 50 of the outer panel 36. The gap G between the second main section 50 and the first main section 44 of the first panel 34 defines a first distance $D_1$ measured between the first main section 44 and the second main section 50. A first end 60a of the gap reduction member 60 is fixed to the first main section 44, while a second end 60b (a distal end) of the gap reduction member 60 is cantilevered from the first main section 44 and is spaced apart from the second main section 50. Further, the gap reduction member 60 defines a first length $D_2$ measured from the first end 60a of the gap reduction member 60 to the second end 60b. The first length $D_2$ is less than the first distance $D_1$. As is also shown in FIGS. 5, 6 and 8, the overall width of the gap reduction member 60 is less than an overall width of the first main section 44. As with the first main section 44, the gap reduction member 60 is located between the B-pillar 24 and the C-pillar 26, and is spaced apart from the B-pillar 24 and the C-pillar 26. Further, the gap reduction member 60 is located below the window receiving area 40 and above the floor 38. As well, the gap reduction member 60 located below the upper window receiving area 40 and above the floor 38 such that the gap reduction member 60 is closer to the floor 38 than to the window receiving area 40.

The gap reduction member 60 is not a structural element. It is preferably made of a light material, such as, for example, a rigid polymer, a light-weight rigid foam material such as a resin based foam or an injection molded material. The material chosen for manufacture of the gap reduction member 60 is such that the gap reduction member 60 is a rigid member that is non-compressible and has sufficient strength to transmit force (force with significant velocity associated therewith) in a manner described in greater detail below. However, the gap reduction member 60 is not intended or manufactured as a structural element.

Figure 9:
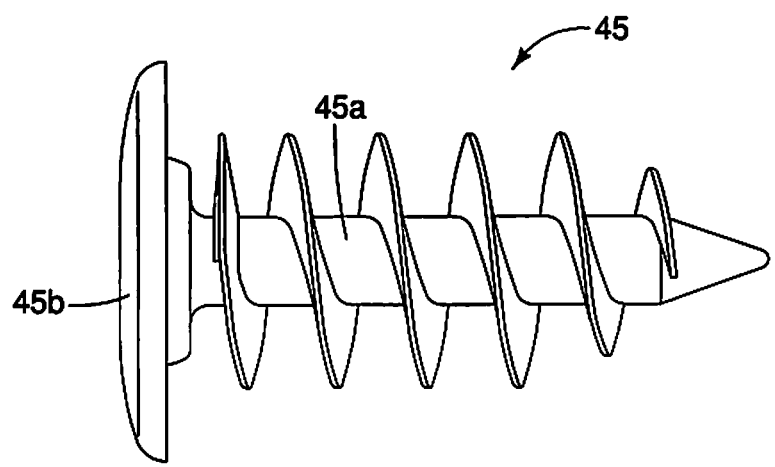
FIG. 9 is a side view of one of the mechanical fasteners shown removed from the gap reduction member in accordance with the first embodiment.
Figure 10:
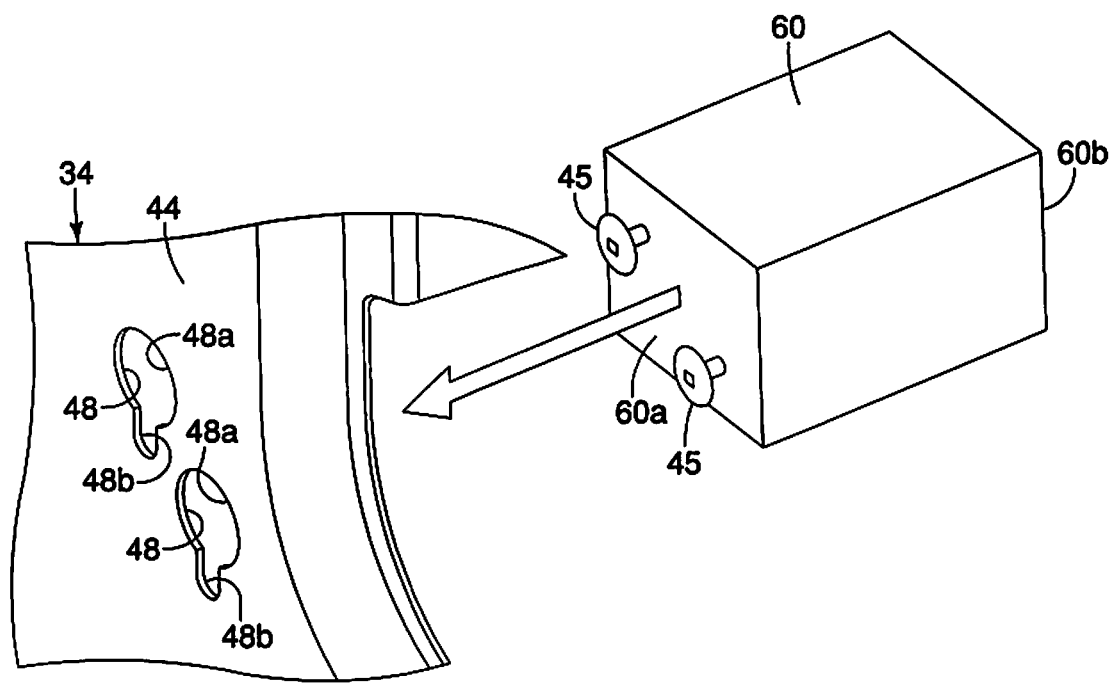
FIG. 10 is an exploded perspective view of the portion of the first main section of the inner panel similar to FIG. 8, showing openings in the first main section and indicating the attaching orientation of the gap reduction member in accordance with the first embodiment.

As shown in FIGS. 8 and 10, the gap reduction member 60 attaches to the first main section 44 via mechanical fasteners 45 shown in FIG. 9. The mechanical fasteners 45 have large threads on a threaded shaft portion 45a thereof that are screwed into the gap reduction member 60 such that the fastener 45 can grip the gap reduction member 60 and secure it to the first main section 44. The fasteners 45 are provided with a large head 45b that affords easy installation, as is explained below.

As shown in FIG. 10, the first main portion 44 of the inner panel 34 is provided with a pair of openings 48. Each opening 48 has a large upper portion 48a and a narrow lower portion 48b. The large upper portion 48a has a diameter that is slightly larger than a diameter of the head 45b of the fastener 45 such that the head 45b of the fastener 45 easily inserts into the opening 48. The narrow lower portion 48b has a width that is smaller than the diameter of the head 45b of the fastener 45, but is slightly larger than the diameter of the threaded shaft portion 45a of the fastener 45. The fasteners 45 are pre-threaded into the gap reduction member 60, but are not fully tightened such that there is a gap between the gap reduction member 60 and the heads 45b of the fasteners 45. When the sensors $S_1$ through $S_N$ and the gap reduction member 60 are installed to the vehicle body structure 14, the inner panel 34 and the outer panel 36 are already fixedly attached to one another. The gap reduction member 60 is easily installed between the inner panel 34 and the outer panel 36 through the adjacent gap or opening in the inner panel 34, with the sensor $S_1$ being installed nearby at the sensor installation location 46. The heads 45b of the fasteners 45 are inserted into the large upper portion 48a of the openings 48. Thereafter, the gap reduction member 60 and the fasteners 45 are moved downward to the position shown in FIG. 8, such that the threaded shaft portions 45a of the fasteners 45 are moved into the narrow lower portion 48b of each of the openings 48. Once the threaded shaft portions 45a of the fasteners 45 are moved into the narrow lower portion 48b, the fasteners 45 are tightened, thereby securing the gap reduction member 60 to the inner panel 34, as shown in FIG. 8.

Figure 11:
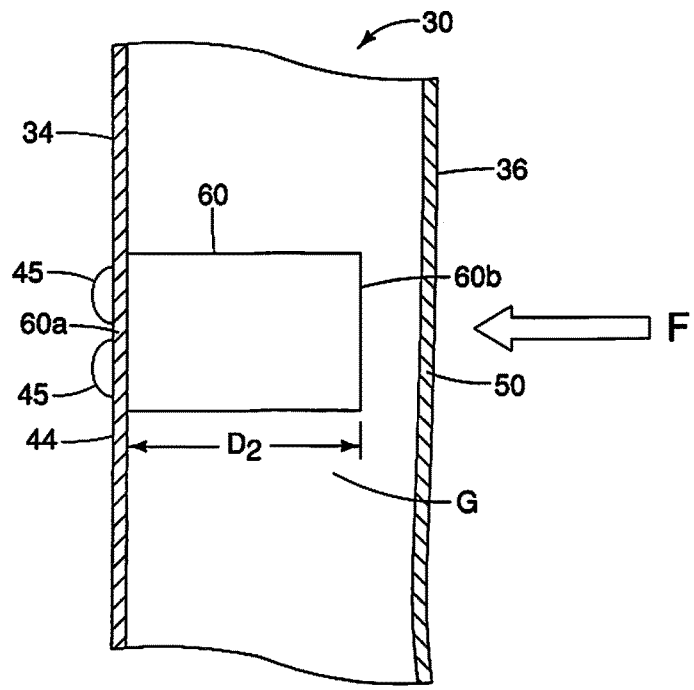
FIG. 11 is another cross-sectional view of the portion of the side wall structure similar to FIG. 7 showing a predetermined level of force about to act on the second main section of the outer panel, with the gap reduction member installed to the first main section of the inner panel within the gap and being spaced apart from the second main section of the outer panel in accordance with the first embodiment.
Figure 12:
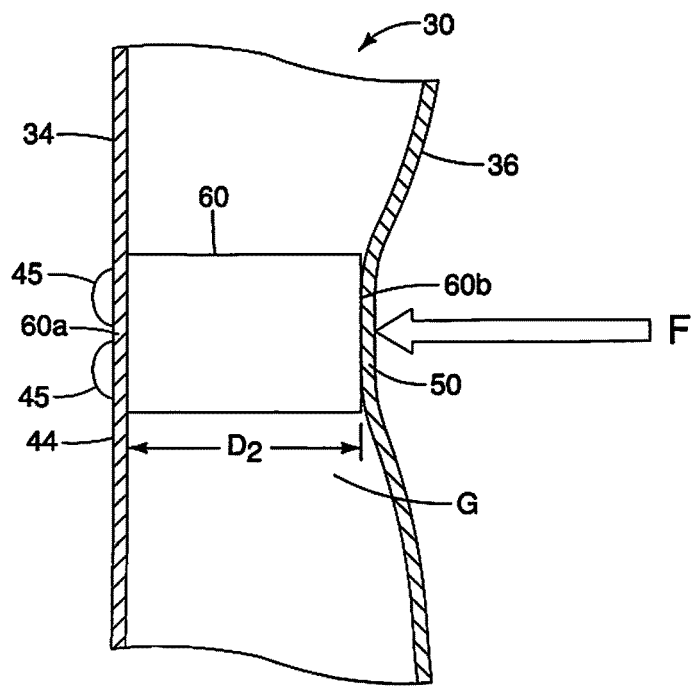
FIG. 12 is another cross-sectional view of the portion of the side wall structure similar to FIG. 11 showing the second main section of the outer panel in a deformed state after the predetermined level of force has acted thereon causing the second main section of the outer panel to move into contact with the gap reduction member in accordance with the first embodiment.

The gap reduction member 60 is provided within the side wall structure 30, not as a structural member, but rather as a force transmitting element. As shown in FIGS. 11 and 12, when a predetermined level of force F is applied to the outer panel 36, the outer panel 36 responds by deforming and moving into contact with the gap reduction member 60. FIG. 11 shows the outer panel 36 is an undeformed state prior to application of the predetermined level of force F. The distance between the second end 60b of the gap reduction member 60 and the outer panel 36 is the difference between $D_1$ and $D_2$. FIG. 12 shows the outer panel 36 after the force F has been applied and the outer panel 36 has been deformed. Once the outer panel 36 has been deformed, it moves into contact with the second end 60b.

The inner panel 34, the outer panel 36, the gap reduction member 60 and the pulse detection sensor $S_1$ are configured and arranged such that in response the predetermined level of force F being applied to the outer panel 36, the predetermined level of force F is transmitted through the gap reduction member 60 to the inner panel 34. Since the pulse detection sensor $S_1$ is directly attached to the inner panel 34 at the sensor installation location 46, the predetermined level of force F is detected by the pulse detection sensor $S_1$. Once the pulse detection sensor $S_1$ detects the predetermined level of force F, the controller 20 (the triggering device) causes one or more of the airbag assemblies $B_1$ through $B_N$ to inflate.

The predetermined level of force F can be applied to the vehicle 10 as part of a test of the vehicle body structure 14 and a test of the overall airbag deployment operation. During such tests, the location of the sensors $S_1$ has been examined. The sensors $S_1$ through $S_N$ are preferably positioned at locations that provide rapid detection of application of the predetermined level of force F. Such tests have shown that response to application of the predetermined level of force F is improved when the sensor $S_1$ is installed at the sensor installation location 46 and the first main section 44 is provided with the gap reduction member 60. For example, tests have been conducted on vehicle body structures with the gap reduction member 60 and without the gap reduction member 60. When the side wall structure 30 is provided with the gap reduction member 60 the test results yield a force detection response by the sensor $S_1$ (at the sensor installation location 46) that is several milliseconds faster that tests conducted without the gap reduction member 60, and where the force contact location for both sets of tests is on the outer panel 36 adjacent to location of the first main section 44.

It should be understood from the drawings and the description herein that the sensor installation location 46 is located adjacent to the C-pillar 26 of the vehicle 10. The first main section 44 of the inner panel 34 and the gap reduction member 60 are centrally located between the B-pillar 24 and the C-pillar 26 of the vehicle 10. Tests conducted with the predetermined level of force F contacting the vehicle 10 at one of the B-pillar 24 and the C-pillar 26 provides a rapid detection response of the sensor $S_1$ that is generally the same as the detection response of the sensor $S_1$ when the point of application of the force F is at, or adjacent to the first main section 44 with the inclusion of the gap reduction member 60.

It should also be understood from the drawings and the description herein, that the gap reduction member 60 and related one of the sensors $S_1$ through $S_N$ can be installed at any of a variety of locations around the vehicle body structure 14 where there is a desire for convenient placement of the one of the sensors $S_1$ through $S_N$ and corresponding consideration of a reduction of a gap between elements of the vehicle body structure 14 proximate the one of the sensors $S_1$ through $S_N$, in order to ensure rapid airbag deployment response from the one of the sensors $S_1$ through $S_N$.

Second Embodiment

Figure 13:
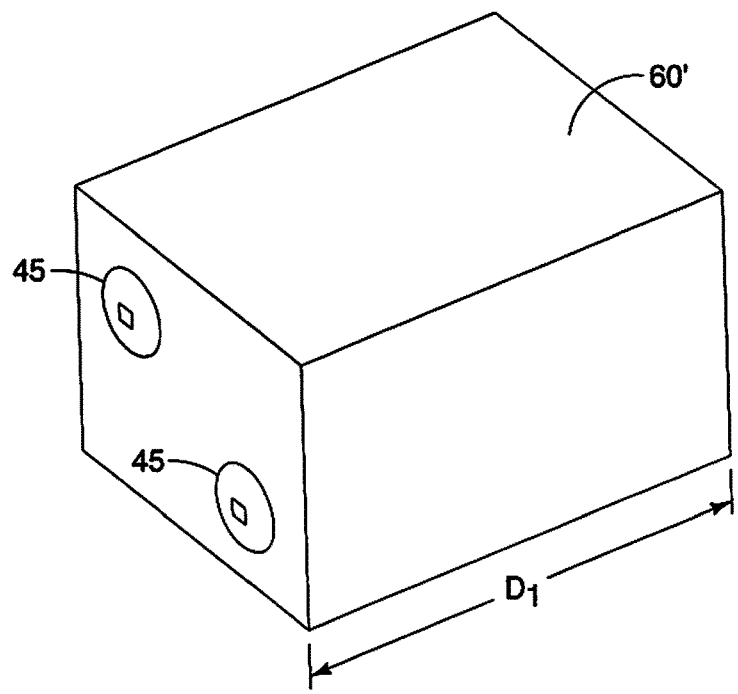
FIG. 13 is a perspective view of the gap reduction member shown removed from the vehicle body structure in accordance with a second embodiment.
Figure 14:
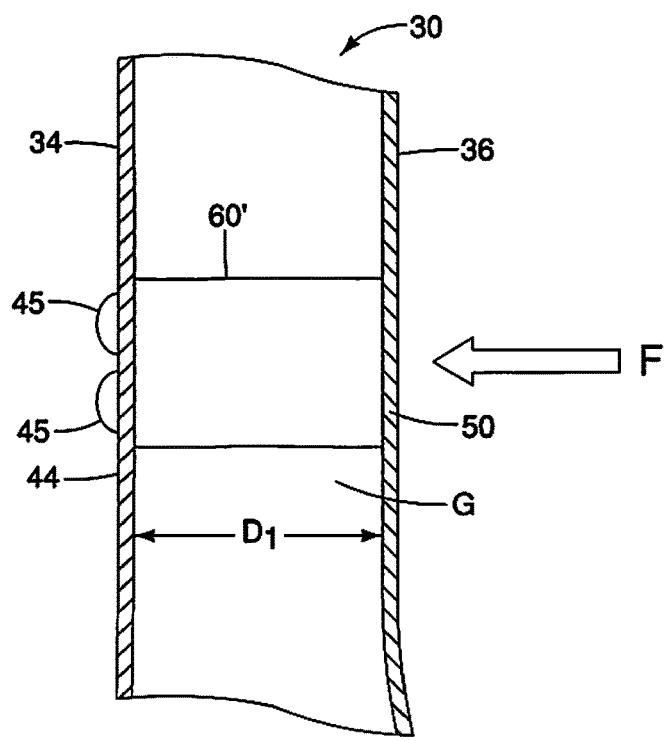
FIG. 14 is a cross-sectional view of a portion of the side wall structure showing a predetermined level of force about to act on the second main section of the outer panel, with the gap reduction member depicted in FIG. 13 installed to the first main section of the inner panel within the gap such that the gap reduction member is in contact with both the first main section of the inner panel and the second main section of the outer panel in an undeformed state in accordance with the second embodiment.

Referring now to FIGS. 13 and 14, a gap reduction member 60' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

In the second embodiment, the gap reduction member 60' is very similar to the gap reduction member 60 of the first embodiment, except that the gap reduction member 60' has an overall length that is equal to $D_1$, the width of the gap G. More specifically, the gap reduction member 60' has a first end that contacts the first main section 44 of the inner panel 34 and a second end of the gap reduction member 60' contacts the second main section 50 of the outer panel 36 with the outer panel 36 in an undeformed state in the absence of application of the predetermined force F. Hence, when the predetermined force F is applied to the outer panel 36, the gap reduction member 60' receives the predetermined force F, transmitted directly from the outer panel 36. With this embodiment, the response time of detection by the sensor $S_1$ is generally the same as in the first embodiment.

In the second embodiment, the gap reduction member 60' includes the fasteners 45. However, since the gap reduction member 60' has the same dimension as the gap G, it is possible to omit the fasteners and force fit the gap reduction member 60' into the gap G. Alternatively, the fasteners 45 can be replaced with an adhesive material to fix the gap reduction member 60' to the inner panel 34.

Third Embodiment

Figure 15:
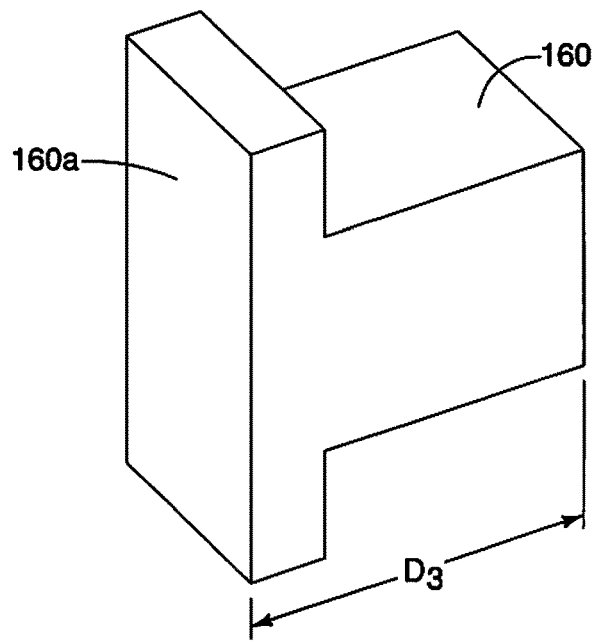
FIG. 15 is a perspective view of a gap reduction member shown removed from the vehicle body structure in accordance with a third embodiment.

Referring now to FIG. 15, a gap reduction member 160 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The gap reduction member 160 has an overall length $D_3$ that is several thousands of an inch greater than the width $D_1$ of the gap G, described above in the first embodiment. Hence, the gap reduction member 160 has a length that is greater than the width of the gap G. The gap reduction member 160 can be wedged or force fitted into position between the first main section 44 of the inner panel 34 and the second main section 46 of the outer panel 36 in the absence of fasteners.

Fourth Embodiment

Figure 16:
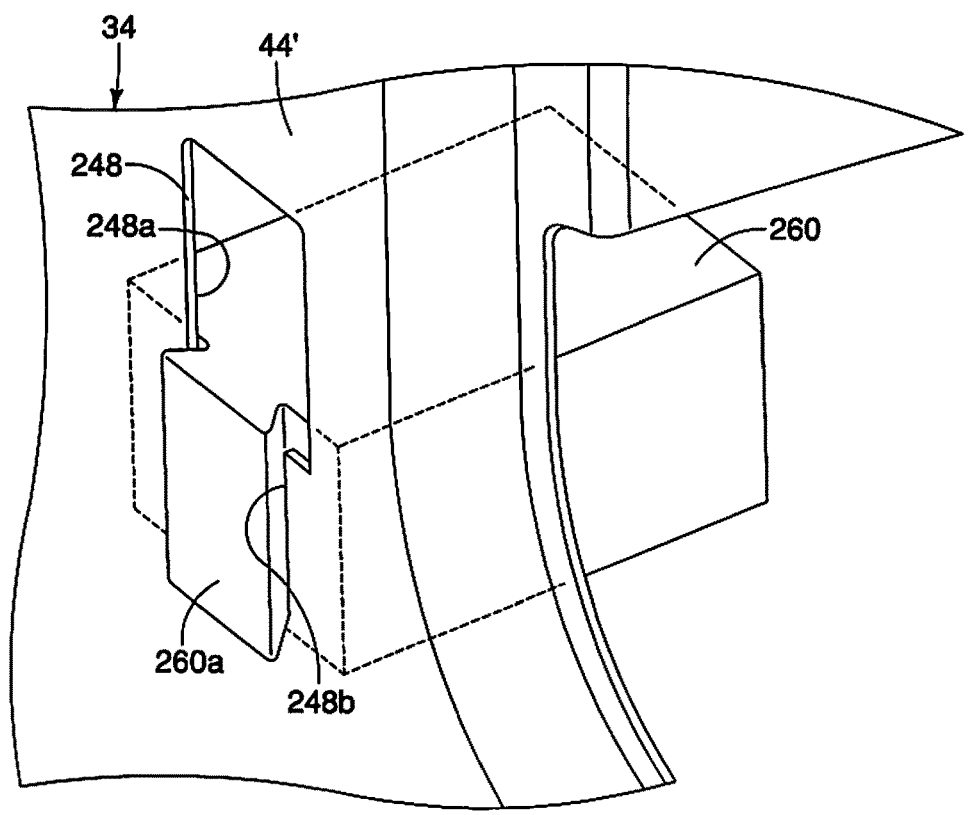
FIG. 16 is a perspective view of a portion of a first main section of an inner panel showing a gap reduction member attached to the inner panel via a dovetail and slot arrangement in accordance with a fourth embodiment.

Referring now to FIG. 16 a gap reduction member 260 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity. The parts of the fourth embodiment that differ from the parts of the first embodiment will be indicated with a single prime (').

In the fourth embodiment, the gap reduction member 260 includes a dovetail section 260a and a first main section 44' of the inner panel 34 defines a slot 248 with the dovetail section 260a being installed to the slot 248. The slot 248 includes an upper portion 248a that is larger than the widest portion of the dovetail section 260a of the gap reduction member 260. The slot 248 and includes a narrowed section 248b that is narrower than the widest portion of the dovetail section 260a of the gap reduction member 260, but slightly wider than the base of the dovetail section 260a of the gap reduction member 260. Hence, the dovetail section 260a is inserted into the upper portion 248a of the slot 248, then pushed downward into the narrowed section 248a of the slot 248, thereby making installation of the gap reduction member 260 simple.

The various features of the vehicle 10 are conventional components that are well known in the art. Since vehicle features are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure comprising:
a floor;
a roof rail;
a first pillar structure extending between the floor and the roof rail;
a second pillar structure spaced apart from the first pillar structure extending between the floor and the roof rail;
a first panel having a first main section and a sensor installation location, the first panel at least partially defining the first pillar structure and at least partially defining the second pillar structure, the first panel extending between the first pillar structure and the second pillar structure with first main section being located between the first pillar and the second pillar, the first main section being spaced apart from the first pillar structure and the second pillar structure, and the sensor installation location being spaced apart from the first main section and being adjacent to one of the first pillar structure and the second pillar structure;
a second panel extending between the first pillar structure and the second pillar structure, the first panel and the second panel being attached to one another along the roof rail and proximate the floor, the second panel having a second main section that is spaced apart from the first main section of the first panel and defining a gap therebetween;
a pulse detection sensor attached to the first panel at the sensor installation location; and
a gap reduction member installed to the first main section of the first panel, the gap reduction member extending from the first main section toward the second main section within the gap, with the gap reduction member being spaced apart from each of the first pillar structure and the second pillar structure.

2. The vehicle body structure according to claim 1, wherein
the gap between the second main section and the first main section of the first panel defines a first distance measured between the first main section and the second main section.

3. The vehicle body structure according to claim 2, wherein
the gap reduction member has a first end and a second end, the first end being fixed to the first main section, the second end being spaced apart from the second main section, the gap reduction member defining a first length measured from the first end to the second end, the first length being less than the first distance.

4. The vehicle body structure according to claim 2, wherein
the gap reduction member has a first end and a second end, the first end being fixed to the first main section, the second end being pressed against the second main section, the gap reduction member defining a first length measured from the first end to the second end, the first length being equal to the first distance.

5. The vehicle body structure according to claim 1, wherein
the gap reduction member attaches to the first main section via mechanical fasteners.

6. The vehicle body structure according to claim 1, wherein
the gap reduction member includes a dovetail section and the first main section defines a slot with the dovetail section being installed to the slot.

7. The vehicle body structure according to claim 1, wherein
the gap reduction member is fitted between the first main section and the second main section such that the gap reduction member contacts both the first main section and the second main section.

8. The vehicle body structure according to claim 7, wherein
the second panel, the first panel, the gap reduction member and the pulse detection sensor are configured and arranged such that in response to a predetermined level of force being applied to at least one of the first panel and the second panel, movement of the at least one of the first panel and the second panel toward the other of the first panel and the second panel causes the pulse detection sensor to detect the predetermined level of force.

9. The vehicle body structure according to claim 1, wherein
the gap reduction member has a first end installed to the first main section and a second end that is located adjacent to the second main section of the second panel in a non-contacting relationship relative to the second main section of the second panel.

10. The vehicle body structure according to claim 9, wherein
the second panel, the first panel, the gap reduction member and the pulse detection sensor are configured and arranged such that in response a predetermined level of contacting force being applied to the second panel, the predetermined level of force is transmitted through the gap reduction member to the first panel such that the predetermined level of force is detected by the pulse detection sensor.

11. The vehicle body structure according to claim 1, further comprising:
a controller connected to the pulse detection sensor at least partially defining a force contact response system.

12. The vehicle body structure according to claim 11, wherein
the force contact response system includes an airbag system having at least one airbag, a triggering device and the pulse detection sensor, the pulse detection sensor and the triggering device being configured such that in response to the pulse detection sensor detecting a predetermined level of force being applied to one of the first panel and the second panel, the triggering device causes the airbag to inflate.

13. The vehicle body structure according to claim 1, wherein
the gap reduction member is made of a material selected from a material consisting of one of the following: an injection molded material and a light-weight rigid foam material.

14. The vehicle body structure according to claim 1, wherein
the first panel is an inner body panel and a second panel is an outer body panel that together define a side wall section of the vehicle.

15. The vehicle body structure according to claim 1, wherein
the first panel and the second panel being rigidly connected to one another at locations spaced apart from the gap reduction member.

16. A vehicle body structure comprising:
a floor of a passenger compartment;
a roof rail;
an inner panel having a plurality of first attachment locations along the roof rail and proximate the floor, a window receiving area, a first main section and a sensor installation location that is spaced apart from the first main section, the inner panel being attached to the floor, the first main section extending in a vertical direction beneath a central portion of the window receiving area;
an outer panel having a plurality of second attachment locations along the roof rail and proximate the floor that are rigidly coupled to corresponding locations of the plurality of first attachment locations of the inner panel and a second main section defining a wall section of a vehicle, with the second main section being spaced apart from the first main section of the inner panel defining a gap therebetween, the outer panel being attached to the roof rail;
a pulse detection sensor attached to the inner panel at the sensor installation location;
an airbag assembly installed within the vehicle and connected to the pulse detection sensor; and
a gap reduction member that is non-compressible installed to the first main section of the inner panel below the window receiving area and above the floor such that the gap reduction member is closer to the floor than to the window receiving area, the gap reduction member extending from the first main section toward the second main section within the gap, the gap reduction member being configured and located to define a force transmitting element such that in response to a predetermined level of force being applied to the outer panel proximate the gap reduction member, at least a portion of the predetermined level of force is transmitted from the outer panel through the gap reduction member to first main section of the inner panel such that the predetermined level of force is detected by the pulse detection sensor triggering deployment of the airbag assembly.

17. The vehicle body structure according to claim 16, wherein
the gap reduction member is fitted between the first main section and the second main section such that the gap reduction member contacts both the first main section and the second main section.

18. The vehicle body structure according to claim 17, wherein
the outer panel, the inner panel, the gap reduction member and the pulse detection sensor are configured and arranged such that in response to a predetermined level of force contacting the outer panel, movement of the outer panel toward the inner panel causes the pulse detection sensor to detect the predetermined level of force.

19. The vehicle body structure according to claim 16, wherein
the gap reduction member has a first end installed to the first main section and a second end that is located adjacent to the second main section of the outer panel in a non-contacting relationship relative to the second main section of the outer panel.

20. The vehicle body structure according to claim 19, wherein
the outer panel, the inner panel, the gap reduction member and the pulse detection sensor are configured and arranged such that in response to a predetermined level of force contacting the outer panel, the outer panel contacts the gap reduction member and causes the pulse detection sensor to detect the predetermined level of force.

* * * * *